(12) United States Patent
Beason et al.

(10) Patent No.: US 7,196,659 B1
(45) Date of Patent: *Mar. 27, 2007

(54) COMBINED GLOBAL POSITIONING SYSTEM RECEIVER AND RADIO

(75) Inventors: Lawrence W. Beason, Olathe, KS (US); Thomas H. Walters, Gardner, KS (US); Ronald B. Kabler, Olathe, KS (US)

(73) Assignee: Garmin Corporation, Shijr (TW)

( * ) Notice: Subject to any disclaimer, the term of this patent is extended or adjusted under 35 U.S.C. 154(b) by 209 days.

This patent is subject to a terminal disclaimer.

(21) Appl. No.: 10/299,339

(22) Filed: Nov. 19, 2002

Related U.S. Application Data

(63) Continuation of application No. 10/043,033, filed on Jan. 9, 2002, now Pat. No. 6,492,941, which is a continuation of application No. 09/306,938, filed on May 7, 1999, now Pat. No. 6,373,430.

(51) Int. Cl.
H04B 7/185 (2006.01)

(52) U.S. Cl. .................. 342/357.1; 342/357.09; 342/419; 342/357.06

(58) Field of Classification Search ............ 342/357.01, 342/357.06, 357.08, 357.09, 357.1, 419, 342/455; 701/213, 251, 301
See application file for complete search history.

(56) References Cited

U.S. PATENT DOCUMENTS

| | | | |
|---|---|---|---|
| 3,063,048 A | 11/1962 | Lehan et al. | 343/112 |
| 4,021,807 A | 5/1977 | Culpepper et al. | 343/112 |

(Continued)

FOREIGN PATENT DOCUMENTS

| | | |
|---|---|---|
| DE | 004320976 | 1/1995 |
| EP | 0 061 674 | 10/1982 |
| EP | 0 123 562 | 10/1984 |
| EP | 0 242 099 | 4/1987 |
| FR | 2 541 801 | 2/1983 |
| JP | 10319396 | 12/1998 |

OTHER PUBLICATIONS

"Tendler Updates FoneFinder", Jun. 28, 1999 *Wireless Week*.
"Automatic Vehicle Monitoring" by J.S. Bravman et al., Fairchild Space & Electronics, Co., Germantown, MD.
"Application of the Global–Positioning System (GPS) to Automatic Vehicle Monitoring"—1981 Carnahan Conference on Crime Countermeasures, University of Kentucky, Lexington, May 13–15, 1981.
"AX.25 Amateur Packet–Radio Link–Layer Protocol", Version 2.2, Nov., 1997 from http://www.tapr.org.
APRS Giude—"The Automatic Position Reporting System", compiled from a series of articles by Arte Booten, from http://www.oarc.net.
NavTalk Cellular Phone/GPS Receiver: Owners Manual and Reference Guide, Garmin Corporation, Jan. 2000.

*Primary Examiner*—Dao Phan
(74) *Attorney, Agent, or Firm*—David L. Terrell

(57) ABSTRACT

A portable GPS/radio unit communicates over a wireless radio network with at least one other unit which is transmitting radio signals over the network indicative of that unit's location. The GPS/radio unit comprises a GPS receiver for receiving satellite signals from a plurality of satellites, a radio receiver for receiving the radio signals transmitted by the other unit, a processor for calculating the unit's location as a function of the received satellite signals and for identifying the location of the other unit based on the received radio signals, and a display for indicating the location of the other unit. The display may indicate the respective locations of multiple units and may also display unique identifiers for each of the units. A system and method for indicating the location of one portable GPS/radio unit on the display of another portable GPS/radio unit involves at least two such units communicating with one another over a wireless radio network.

23 Claims, 2 Drawing Sheets

U.S. PATENT DOCUMENTS

| | | |
|---|---|---|
| 4,131,849 A | 12/1978 | Freeburg et al. |
| 4,296,408 A | 10/1981 | Neuringer |
| 4,445,118 A | 4/1984 | Taylor et al. ............... 343/357 |
| 4,459,667 A | 7/1984 | Takeuchi .................... 364/424 |
| 4,475,010 A | 10/1984 | Huensch et al. ............... 179/2 |
| 4,593,273 A | 6/1986 | Narcisse .................... 340/539 |
| 4,651,157 A | 3/1987 | Gray et al. ................. 342/457 |
| 4,675,656 A | 6/1987 | Narcisse .................... 340/539 |
| D291,288 S | 8/1987 | Suzuki ....................... D10/78 |
| 4,750,197 A | 6/1988 | Denekamp et al. ........... 379/58 |
| 4,809,005 A | 2/1989 | Counselman, III .......... 342/352 |
| D301,882 S | 6/1989 | Watanabe ................. D14/140 |
| D302,271 S | 7/1989 | Watanabe ................. D14/140 |
| 4,884,132 A | 11/1989 | Morris et al. ................. 358/93 |
| 4,891,650 A | 1/1990 | Sheffer ....................... 342/457 |
| 4,907,290 A | 3/1990 | Crompton ................... 455/56 |
| 4,912,756 A | 3/1990 | Hop ........................... 379/60 |
| 4,953,198 A | 8/1990 | Daly et al. ................... 379/61 |
| 4,972,479 A | 11/1990 | Tobias, Jr. et al. ............. 380/33 |
| D312,650 S | 12/1990 | Charrier .................... D16/242 |
| 4,977,399 A | 12/1990 | Price et al. ............ 340/825.44 |
| D314,713 S | 2/1991 | Cirrany et al. ............... D10/65 |
| 5,021,794 A | 6/1991 | Lawrence .................... 342/457 |
| 5,043,736 A | 8/1991 | Darnell et al. ............... 342/357 |
| 5,055,851 A | 10/1991 | Sheffer ....................... 342/457 |
| D326,450 S | 5/1992 | Watanabe ................. D14/138 |
| 5,119,504 A | 6/1992 | Durboraw, III ............ 455/54.1 |
| 5,144,323 A | 9/1992 | Yonkers ..................... 342/386 |
| 5,146,231 A | 9/1992 | Ghaem et al. ............... 342/419 |
| 5,155,689 A | 10/1992 | Wortham .................... 364/460 |
| 5,172,110 A | 12/1992 | Tiefengraber .......... 340/825.49 |
| 5,193,215 A | 3/1993 | Olmers ........................ 455/66 |
| 5,202,829 A | 4/1993 | Geier |
| 5,208,756 A | 5/1993 | Song ......................... 364/449 |
| 5,218,367 A | 6/1993 | Sheffer et al. ............... 342/457 |
| 5,219,067 A | 6/1993 | Lima et al. ............... 200/302.2 |
| 5,223,844 A | 6/1993 | Mansell et al. ............. 342/357 |
| D337,582 S | 7/1993 | Lewo ....................... D14/144 |
| 5,235,633 A | 8/1993 | Dennison et al. ............. 379/60 |
| 5,245,314 A | 9/1993 | Kah, Jr. ..................... 340/539 |
| 5,265,150 A | 11/1993 | Helmkamp et al. ........... 379/58 |
| 5,289,195 A | 2/1994 | Inoue ......................... 342/457 |
| 5,299,132 A | 3/1994 | Wortham .................... 364/460 |
| 5,301,368 A | 4/1994 | Hirata ......................... 455/78 |
| 5,307,277 A | 4/1994 | Hirano ....................... 364/449 |
| 5,315,636 A | 5/1994 | Patel .......................... 379/58 |
| 5,323,164 A | 6/1994 | Endo ......................... 342/357 |
| 5,327,144 A | 7/1994 | Stilp et al. .................. 342/387 |
| 5,334,974 A | 8/1994 | Simms et al. ............... 340/990 |
| 5,341,410 A | 8/1994 | Aron et al. .................... 379/59 |
| 5,043,736 A | 9/1994 | Darnell et al. ............. 342/357 |
| 5,345,244 A | 9/1994 | Gildea et al. |
| 5,355,511 A | 10/1994 | Hatano et al. ............. 455/11.1 |
| 5,361,212 A | 11/1994 | Class et al. ................. 364/428 |
| 5,364,093 A | 11/1994 | Huston et al. ............ 273/32 R |
| 5,365,450 A | 11/1994 | Schuchman et al. ........ 364/449 |
| 5,379,224 A | 1/1995 | Brown et al. ............... 364/449 |
| 5,389,934 A | 2/1995 | Kass .......................... 342/357 |
| 5,408,238 A | 4/1995 | Smith ........................ 342/357 |
| 5,414,432 A | 5/1995 | Penny et al. ................ 342/357 |
| 5,422,816 A | 6/1995 | Sprague et al. |
| 5,434,789 A | 7/1995 | Fraker et al. ............... 364/460 |
| 5,438,518 A | 8/1995 | Bianco et al. ............... 364/460 |
| 5,448,773 A | 9/1995 | McBurney et al. ........ 455/12.1 |
| D363,488 S | 10/1995 | Shumaker ................. D14/230 |
| 5,469,175 A | 11/1995 | Boman ...................... 342/357 |
| D365,032 S | 12/1995 | Laverick et al. ............. D10/78 |
| D365,292 S | 12/1995 | Laverick et al. ............. D10/78 |
| 5,493,309 A | 2/1996 | Bjornholt .................... 342/455 |
| 5,506,587 A | 4/1996 | Lans ......................... 342/357 |
| 5,513,183 A | 4/1996 | Kay et al. ................... 370/95.3 |
| 5,519,403 A | 5/1996 | Bickley et al. |
| 5,528,248 A | 6/1996 | Steiner et al. |
| 5,539,398 A | 7/1996 | Hall et al. .................. 340/907 |
| 5,555,286 A | 9/1996 | Tendler ....................... 379/59 |
| 5,557,606 A | 9/1996 | Moon et al. .................. 370/31 |
| 5,570,095 A | 10/1996 | Drouilhet, Jr. et al. ...... 342/357 |
| 5,581,259 A | 12/1996 | Schipper .................... 342/451 |
| 5,592,382 A | 1/1997 | Colley |
| 5,650,770 A | 7/1997 | Schlager et al. ............. 340/573 |
| 5,654,718 A | 8/1997 | Beason et al. ............... 342/357 |
| 5,689,269 A | 11/1997 | Norris ........................ 342/357 |
| 5,689,809 A | 11/1997 | Grube et al. ............... 455/54.1 |
| 5,712,899 A | 1/1998 | Pace, II ....................... 379/58 |
| 5,742,666 A | 4/1998 | Alpert ......................... 379/58 |
| 5,781,150 A | 7/1998 | Norris ........................ 342/357 |
| 5,786,789 A | 7/1998 | Janky ........................ 342/357 |
| 5,797,091 A | 8/1998 | Clise et al. .................. 455/404 |
| 5,826,195 A | 10/1998 | Westerlage et al. ......... 455/456 |
| 5,848,373 A | 12/1998 | DeLorme et al. ........... 701/200 |
| 5,877,724 A | 3/1999 | Davis |
| 5,890,070 A | 3/1999 | Hamada |
| 5,892,441 A | 4/1999 | Woolley et al. |
| 5,902,347 A | 5/1999 | Backman et al. ........... 701/200 |
| 5,914,675 A | 6/1999 | Tognazzini ................. 340/989 |
| 5,929,752 A | 7/1999 | Janky et al. ................ 340/426 |
| 5,938,721 A | 8/1999 | Dussell et al. |
| 5,952,959 A | 9/1999 | Norris ........................ 342/357 |
| 5,959,529 A | 9/1999 | Kail ........................... 340/539 |
| 5,963,130 A | 10/1999 | Schlager et al. ............. 340/540 |
| 6,002,982 A | 12/1999 | Fry ............................ 701/213 |
| 6,005,513 A | 12/1999 | Hardesty |
| 6,009,375 A | 12/1999 | Sakumoto et al. ...... 342/357.14 |
| 6,011,510 A | 1/2000 | Yee et al. ............... 342/357.09 |
| 6,028,537 A | 2/2000 | Suman et al. ............... 340/988 |
| 6,046,688 A | 4/2000 | Higashikata et al. |
| 6,052,597 A | 4/2000 | Ekstrom ..................... 455/456 |
| 6,085,090 A | 7/2000 | Yee et al. ................... 455/440 |
| 6,111,539 A | 8/2000 | Mannings et al. ...... 342/357.09 |
| 6,124,826 A | 9/2000 | Garthwaite et al. |
| 6,144,336 A | 11/2000 | Preston et al. ......... 342/357.09 |
| 6,148,261 A | 11/2000 | Obradovich et al. ........ 701/208 |
| 6,148,262 A | 11/2000 | Fry ............................ 701/213 |
| 6,166,626 A | 12/2000 | Janky et al. ................ 340/426 |
| 6,166,698 A | 12/2000 | Turnbull et al. ............. 343/713 |
| 6,182,006 B1 | 1/2001 | Meek |
| 6,236,338 B1 | 5/2001 | Hamada |
| 6,236,358 B1 | 5/2001 | Durst et al. |
| 6,246,376 B1 | 6/2001 | Bork et al. |
| 6,266,612 B1 | 7/2001 | Dussell et al. |
| 6,275,707 B1 | 8/2001 | Reed et al. |
| 6,278,402 B1 | 8/2001 | Pippin ................... 342/357.08 |
| 6,295,449 B1 | 9/2001 | Westerlage et al. ......... 455/422 |
| 6,297,781 B1 | 10/2001 | Turnbull et al. ............. 343/713 |
| 6,347,278 B2 | 2/2002 | Ito |
| 6,366,771 B1 | 4/2002 | Angle et al. |
| 6,373,430 B1 | 4/2002 | Beason et al. ......... 342/357.09 |
| 6,374,179 B1 | 4/2002 | Smith et al. |
| 6,389,291 B1 | 5/2002 | Pande et al. |
| 6,411,899 B2 | 6/2002 | Dussell et al. |
| 6,421,608 B1 | 7/2002 | Motoyama et al. |
| 6,430,498 B1 | 8/2002 | Maruyama et al. |
| 6,434,485 B1 | 8/2002 | Beason et al. |
| 6,453,236 B1 | 9/2002 | Aoki |
| 6,456,938 B1 | 9/2002 | Barnard |
| 6,470,267 B1 | 10/2002 | Nozaki |
| 6,492,941 B1 * | 12/2002 | Beason et al. ............. 342/357.1 |
| 6,496,709 B2 | 12/2002 | Murray |
| 6,496,777 B2 | 12/2002 | Tennison et al. |
| 6,504,503 B1 | 1/2003 | Saint-Hilaire et al. |
| 6,518,919 B1 | 2/2003 | Durst et al. |

| | | | | | | |
|---|---|---|---|---|---|---|
| 6,529,824 B1 | 3/2003 | Obradovich et al. | | 2002/0049529 A1 | 4/2002 | Ikeda |
| 6,556,899 B1 | 4/2003 | Pachet et al. | | 2002/0083655 A1 | 5/2002 | Aoyama |
| 6,646,603 B2 | 11/2003 | Dooley et al. | | 2002/0070881 A1 | 6/2002 | Marcarelli et al. |
| 6,765,528 B2 | 7/2004 | Tranchina | | 2002/0102989 A1 | 8/2002 | Calvert et al. |
| 6,768,450 B1 | 7/2004 | Walters et al. | | 2002/0128774 A1 | 9/2002 | Takezaki et al. |
| 6,774,795 B2 | 8/2004 | Eshelman | | 2002/0169551 A1 | 11/2002 | Inoue et al. |
| 6,791,477 B2 | 9/2004 | Sari et al. | | 2002/0193945 A1 | 12/2002 | Tan et al. |
| 6,816,782 B1 | 11/2004 | Walters et al. | | 2002/0198020 A1 | 12/2002 | Mooney |
| 6,850,188 B1 | 2/2005 | Lee et al. | | 2002/0198659 A1 | 12/2002 | Doyle et al. |
| 6,871,144 B1 | 3/2005 | Lee | | 2003/0092433 A1 | 5/2003 | Flannery |
| 2002/0004704 A1 | 1/2002 | Nagatsuma et al. | | 2003/0139150 A1 | 7/2003 | Rodriguez et al. |
| 2002/0006806 A1 | 1/2002 | Kinnumen et al. | | 2004/0155815 A1 | 8/2004 | Muncaster et al. |
| 2002/0173909 A1 | 1/2002 | Verbil | | | | |
| 2002/0028702 A1 | 3/2002 | Kim | | * cited by examiner | | |

COMBINED GLOBAL POSITIONING SYSTEM RECEIVER AND RADIO

RELATED APPLICATIONS

This application is a continuation of application Ser. No. 10/043,033, filed Jan. 9, 2002, now U.S. Pat. No. 6,492,941, and entitled "Combined Global Positioning System Receiver and Radio," which is a continuation of application Ser. No. 09/306,938, filed May 7, 1999 now U.S. Pat. No. 6,373,430, issued Apr. 16, 2002.

BACKGROUND OF THE INVENTION

The present invention is directed generally to a combined global positioning system receiver and radio unit and, more particularly, to a system and method for transmitting position information between a plurality of such units so that one unit can display the position of one or more other units.

A global positioning system (GPS) is an electronic satellite navigation system which permits a user of the system to determine his or her position with respect to the Earth. Global positioning is accomplished through the use of a handheld GPS receiver device which detects and decodes signals from a number of satellites orbiting the Earth. The signals from each of these satellites indicate the position of the satellite and the time at which the signal was sent. To decode the satellite signals, known as spread spectrum signals, and thereby calculate the desired navigational data, a GPS receiver must first "find" or acquire the signals emitted from a minimum number of satellites. Once the receiver is "locked on" to the spread spectrum signals, continuous real-time calculation and monitoring of the user's global position and other navigational data (e.g., velocity of movement) can be performed.

GPS receivers have clocks which are synchronized with clocks in each of the satellites to determine how long it takes the signals to travel from the satellites to the receiver. In this regard, GPS receivers require a highly accurate internal frequency reference in order to acquire the spread spectrum GPS satellite signals. Specifically, acquiring spread spectrum satellite signals from a sufficient number of satellites to perform calculations requires determining the frequency of oscillation of the crystal oscillator utilized in the GPS receiver.

Once the GPS receiver has acquired and decoded signals from a minimum of three satellites, the GPS receiver can calculate the user's position (i.e., latitude and longitude) by geometric triangulation. Upon acquiring signals from a minimum of four satellites, the GPS receiver can also calculate the user's altitude. In addition, GPS receivers are able to calculate the user's speed and direction of travel by continuously updating the user's position. Accordingly, GPS receivers are highly valuable and widely used in navigational systems because of their ability to accurately compute the user's position on or near the Earth in real-time, even as the user is moving.

In addition to the growing popularity and demand for GPS navigational devices, portable two-way radios continue to enjoy widespread popularity. In 1996, the Federal Communications Commission (FCC) established the Family Radio Service (FRS) so that families and other small groups could communicate with one another over very short distances (typically less than one mile) at no charge and without an FCC license. The FRS, which is one of the Citizens Band Radio Services, includes 14 channels in the UHF 460 MHz band. There are a number of commercially available two-way radios which are designed for use with the FRS. The increasing use of both portable radios and global positioning systems has led to proposals to incorporate GPS receivers into portable radio devices.

Notwithstanding the many recent technological advancements in GPS and wireless radio equipment, and increased applications for those technologies, there is not currently a combined portable GPS/radio unit capable of displaying the location of another GPS/radio unit. Likewise, there is not currently a combined portable GPS/radio unit capable of displaying the location of multiple GPS/radio units.

SUMMARY OF THE INVENTION

It is an object of the present invention to provide a combined GPS/radio unit which is capable of displaying the location of at least one other such unit.

Another object of the present invention is to provide a combined GPS/radio unit which is capable of displaying its location and the location of at least one other such unit.

A further object of the present invention is to provide a combined GPS/radio unit which displays the location of another unit together with an identifier for that unit.

Still another object of the present invention is to provide a system in which a plurality of portable units communicate with one another over a wireless radio network and at least one of the units displays the location of other units.

Yet another object of the present invention is to provide a method for displaying the location of a first portable GPS/radio unit on a second portable GPS/radio unit.

These and other related objects of the present invention will become readily apparent upon further review of the specification and drawings. To accomplish the objects of the present invention, a portable GPS/radio unit is provided which is capable of communicating with one or more other such units over a wireless radio network, wherein each of the other units is adapted to transmit radio signals over the network indicative of that unit's location. The GPS/radio unit comprises a GPS receiver for receiving satellite signals from a plurality of satellites, a processor coupled with the GPS receiver for calculating the location of the GPS/radio unit as a function of the received satellite signals, and a radio receiver coupled with the processor for receiving the radio signals transmitted by said other units. The processor is adapted to identify the location of the other units based on the received radio signals. The GPS/radio unit also includes a display for indicating the location of at least one of the other units.

In another aspect of the present invention, a system is provided in which a plurality of portable GPS/radio units communicate with one another over a wireless radio network. The system comprises a first portable GPS/radio unit which has a GPS receiver for receiving satellite signals from a plurality of satellites, a processor for calculating the location of the first unit as a function of the received satellite signals, and a radio transmitter for transmitting radio signals indicative of the location of said first unit. The system further comprises a second portable GPS/radio unit having a GPS receiver for receiving satellite signals from a plurality of satellites, a processor for calculating the location of the second unit as a function of the received satellite signals, a radio receiver for receiving radio signals from one or more other portable units, and a display for indicating the location of the other portable units. Upon receiving radio signals indicative of the location of the first unit, the processor of the second unit identifies the location of the first unit based on the received radio signals.

In still another aspect of the present invention, a method is provided for displaying the location of a first portable GPS/radio unit on a second portable GPS/radio unit. The method comprises receiving a first set of satellite signals from a plurality of satellites at a first portable GPS/radio unit, calculating the location of the first unit as a function of the first set of received satellite signals, receiving a second set of satellite signals from a plurality of satellites at a second portable GPS/radio unit, calculating the location of the second unit as a function of the second set of received satellite signals, transmitting the location of the first unit to the second unit over a wireless radio network, and displaying the location of the first unit on the second unit.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE DRAWINGS

Figure 1:
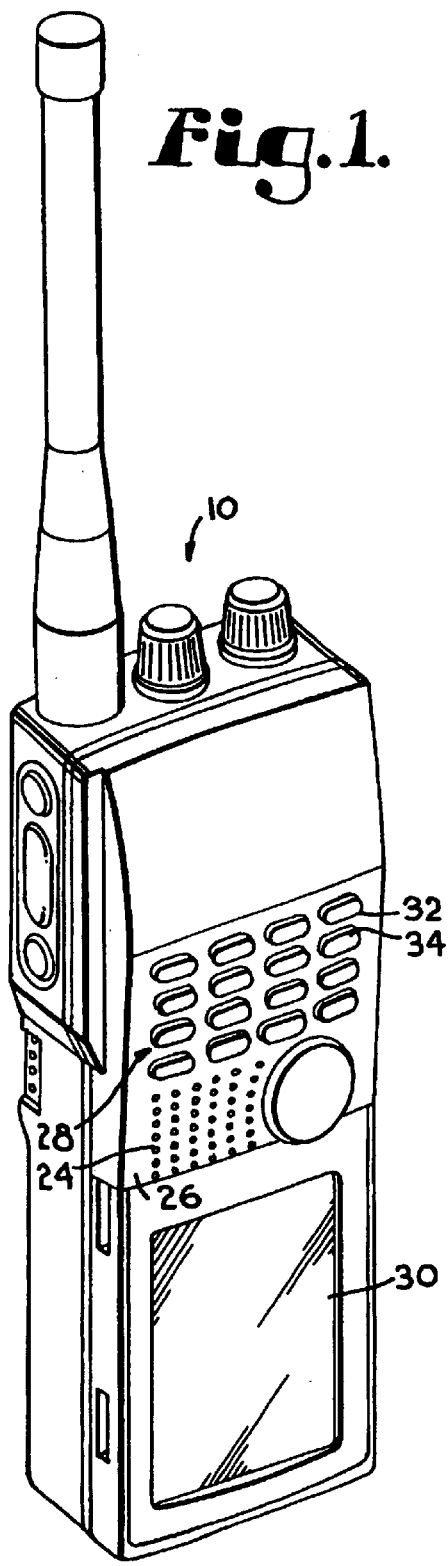
FIG. 1 is a perspective view of a combined GPS/radio unit in accordance with a preferred embodiment of the present invention.
Figure 2:
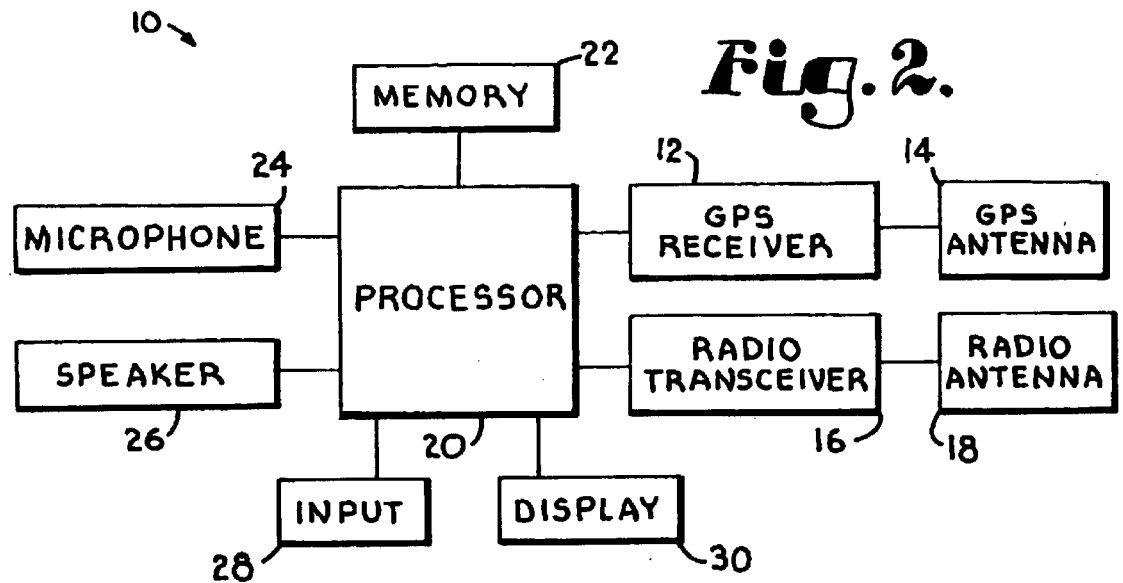
FIG. 2 is a block diagram of the components of the GPS/radio unit of FIG. 1.

Referring to the drawings in greater detail, and initially to FIGS. 1 and 2, the combined GPS/radio unit of the present invention is designated generally by reference numeral 10. Unit 10 comprises a GPS receiver 12, a GPS antenna 14, a radio transceiver 16 and a radio antenna 18. GPS receiver 12 and radio transceiver 16 are electronically coupled with a processor 20 which has an associated memory 22 for storing information such as cartographic data (i.e., electronic maps). The cartographic data may be stored on cartridges which can be removably attached to the unit. For example, an electronic map of a particular city or national park may be stored in a single cartridge. The memory may also store historical location data for the unit 10 or for other units which have transmitted location data to unit 10.

The handheld unit 10 also includes a microphone 24, a speaker 26, an input 28 and a display 30, which is preferably a liquid crystal display (LCD). The user input 28 is preferably an alphanumeric keypad, such as a telephone keypad, which may be used to select and input a name or other identifier for the unit using any combination of the letters, numbers or symbols which are available on the keypad. The keypad 28 shown in FIG. 1 includes four control buttons (the far right column of buttons) in addition to the 12 buttons which are standard on a telephone keypad. In a preferred embodiment, a first control button 32 is coupled with the processor so that depressing that button causes the unit 10 to immediately transmit a radio signal over the network indicative of the location of the unit 10. Similarly, a second control button 34 is preferably coupled with the processor so that depressing that button causes the unit 10 to immediately transmit a radio signal over the network requesting that other users transmit their locations over the network. As will be understood, the user input could be inputs other than a keypad, such as a microphone/voice recognition input, or touch screen, or a menu-driven display input.

Figure 3:
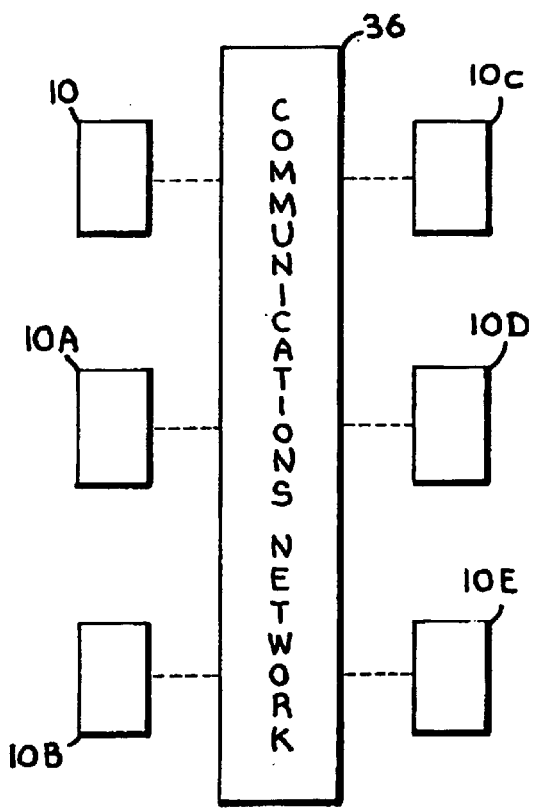
FIG. 3 is a block diagram of a communications networking linking the GPS/radio unit of FIG. 1 with a plurality of other GPS/radio units.

As shown in FIG. 3, unit 10 communicates with a plurality of other such units 10A, 10B, 10C, 10D and 10E over a wireless communications network 36. In the preferred embodiment of the present invention, units 10 and 10A–10E communicate with one another over a public radio network such as the Family Radio Service. While six units 10 and 10A–10E are shown in the exemplary embodiment of FIG. 3, only two such units are necessary for the purposes of the present invention.

Figure 4:
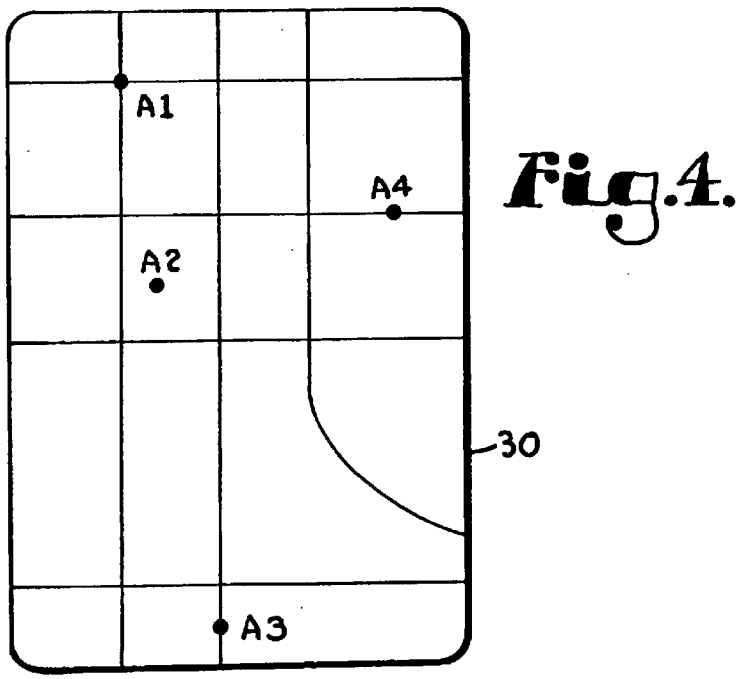
FIG. 4 is a schematic representation of a display on the GPS/radio unit of FIG. 1, wherein the display indicates the location of multiple GPS/radio units on an electronic map.

FIG. 4 is a schematic representation of an exemplary display on unit 10 in which the display 30 indicates the location of four different GPS/radio units. Although darkened circles are used in FIG. 4 to indicate the location of the four units, any other location designator could be used. Display 30 also indicates a unique alphanumeric identifier for each of the four units. For example, the identifiers A1, A2, A3 and A4 may correspond to units 10A, 10B, 10C and 10D, in which case the location of unit 10 would not be shown. Alternatively, the identifier A1 may correspond to unit 10 and the identifiers A2–A4 may correspond to units 10A–10C so that the location of unit 10 is shown on its display. While alphanumeric identifiers were selected in the example of FIG. 4, any available identifier (or combination of identifiers) could be used (e.g., letters, numbers, symbols, icons, colors, etc.) for the units. Moreover, an identifier could perform the dual function of identifying the unit and of indicating the location of the unit, thus eliminating the need for a darkened circle or other such location designator.

In use, unit 10 communicates with other GPS/radio units (e.g., units 10A–E) over the wireless communications network 36 in the same manner that conventional 2-way radios communicate with one another. In addition, these units are able to calculate their location and communicate that location data to one another since they are also equipped with GPS receivers. One way to communicate the location data over the network 36 is to divide the available bandwidth into a voice portion and a data portion so that voice and data are communicated simultaneously over the network. If only a small portion of the bandwidth is allocated for data transmission, there should be no noticeable degradation of the voice communication. Alternatively, the entire communication channel could be used for voice communication except for periodic interruptions during which a burst of location data is sent. If the period of the interruption is short, there should be no noticeable effect on the quality of the voice communication. The timing of the location data transmission should be based on the GPS clock. To decrease the likelihood of data collisions, the units can be configured to transmit location data on a "pseudo-random" basis. Preferably, the units continue to retransmit the location data until an acknowledgment is received. A third approach for communicating location data would be to monitor the network for the absence of voice communication and to transmit location data at that time.

There are many practical applications which would utilize the advantages of the present invention. For example, if a family or other small group is camping or hiking and each person is carrying a GPS/radio unit, then everyone can communicate with one another and see where everyone else is located. Since each person's position would be indicated on the electronic map displayed on each of the units, the other members of the group could quickly locate a member who becomes lost or injured. This would also be the case if the group is located in an urban or residential area.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A portable communication and navigation unit comprising:
   a navigation receiver for receiving signals from a plurality of sources;
   a computing device coupled with the navigation receiver for calculating a location of the communication and navigation unit as a function of the received signals;
   voice communication equipment for permitting voice communications with another communication and navigation unit;
   a radio receiver coupled with the computing device for receiving from the other unit a radio signal indicative of a location of the other unit and an identifier associated with the other unit;
   a display coupled with the computing device for indicating the location of the other unit;
   a radio transmitter coupled with the computing device for transmitting to the other unit a radio signal indicative of the location of the communication and navigation unit and an identifier associated with the communication and navigation unit;
   a portable, handheld housing for housing the navigation receiver, the computing device, the voice communication equipment, the radio receiver, the display, and the transmitter; and
   an input coupled with the processor for permitting a user to select the identifier associated with the communication and navigation unit and the identifier associated with the other unit.

2. The unit of claim 1, wherein the navigation receiver is a GPS receiver, the plurality of sources are satellites, and the signals from the plurality of sources are satellite signals.

3. The unit of claim 1, wherein the voice communication equipment includes a speaker and a microphone.

4. The unit of claim 1, wherein the processor is adapted to identify the location of the other unit based on the received radio signal.

5. The unit of claim 1, wherein the display also indicates the location of the communication and navigation unit.

6. The unit of claim 1, further comprising a memory associated with the processor.

7. The unit of claim 6, wherein cartographic data is stored in the memory, and wherein the display indicates at least a portion of the cartographic data.

8. The unit of claim 1, wherein cartographic data is stored on cartridges which are removably attached to the unit.

9. The unit of claim 6, wherein historical location data for the communication and navigation unit is stored in the memory.

10. The unit of claim 6, wherein historical location data for the other communications and navigation unit is stored in the memory.

11. The unit of claim 1, wherein the display of the communication and navigation unit indicates the identifier associated with the unit, and the display of the other communication and navigation unit indicates the identifier associated with the other unit.

12. The unit of claim 11, wherein the identifier associated with the communication and navigation device is different from the identifier associated with the other communication and navigation unit.

13. The unit of claim 11, wherein the identifier for the communication and navigation unit and for the other communication and navigation unit is selected from the group consisting of: letters, numbers, symbols, icons, and colors.

14. The unit of claim 1, wherein the identifier identifies the unit and indicates the location of the unit.

15. The unit of claim 1, wherein the radio receiver and the radio transmitter are embodied in a radio transceiver.

16. The unit of claim 1, wherein the input is selected from the group consisting of: an alphanumeric keypad, a microphone/voice recognition device, a touch screen, and a menudriven display.

17. The unit of claim 1, wherein the display is a liquid crystal display.

18. A method for displaying the location of a first portable communication and navigation unit on a second portable communication and navigation unit, the method comprising:
   receiving a first set of signals from a plurality of sources at the first portable communication and navigation unit;
   calculating a location of the first unit as a function of the first set of received signals;
   receiving a second set of signals from a plurality of sources at the second portable communication and navigation unit;
   calculating a location of the second unit as a function of the second set of received signals;
   transmitting the location of the first unit to the second unit over a communications network in periodic bursts in association with a voice communication transmitted from the first unit to the second unit; and
   displaying the location of the first unit on the second unit.

19. The method of claim 18, wherein the plurality of sources are satellites and the signals from the plurality of sources are satellite signals.

20. The method of claim 18, further including the step of displaying the location of the second unit on the second unit.

21. The method of claim 18, wherein the communications network is a wireless radio network.

22. The method of claim 21, wherein an available bandwidth of the wireless radio network is divided into a voice portion and a data portion, and the voice and the data are communicated simultaneously over the wireless radio network.

23. A method for displaying the location of a first portable communication and navigation unit on a second portable communication and navigation unit, the method comprising:
   receiving a first set of signals from a plurality of sources at the first portable communication and navigation unit;
   calculating a location of the first unit as a function of the first set of received signals;
   receiving a second set of signals from a plurality of sources at the second portable communication and navigation unit;
   calculating a location of the second unit as a function of the second set of received signals;
   transmitting the location of the first unit to the second unit over a communications network in association with a voice communication transmitted from the first unit to the second unit, wherein the location data is transmitted on a pseudo-random basis so as to decrease the likelihood of data collisions; and
   displaying the location of the first unit on the second unit.

* * * * *